Sept. 24, 1935.  O. T. McILVAINE  2,015,431

PHOTOMETRIC DEVICE

Filed Nov. 22, 1933

INVENTOR
ORAN T. McILVAINE
BY Edmund J. De Pas
ATTORNEY

Patented Sept. 24, 1935

2,015,431

UNITED STATES PATENT OFFICE 2,015,431

PHOTOMETRIC DEVICE

Oran T. McIlvaine, St. Charles, Ill., assignor to McIlvaine Patent Corporation, St. Charles, Ill., a corporation of Illinois Application November 22, 1933, Serial No. 699,126

6 Claims. (Cl. 88—23)

This invention relates to radiometers or photometric devices for measuring the intensity of the visible or invisible light or heat rays as generated from a source or as incident at any desired point, and it has for its objects the provision of a very inexpensive and extremely simple, light reading meter of unitary construction which may be arranged to measure the intensity of illumination at any desired point directly in foot candles or any other units that its scale may be calibrated in without requiring the use of any separate additional parts, apparatus, sources of independent current supply or accessory devices of any kind.

With these and other objects in view, the invention consists in the novel construction, arrangement and combination of parts, hereinafter illustrated and described in some of its embodiments in the accompanying drawing, and particularly pointed out in the appended claims.

Figure 1:
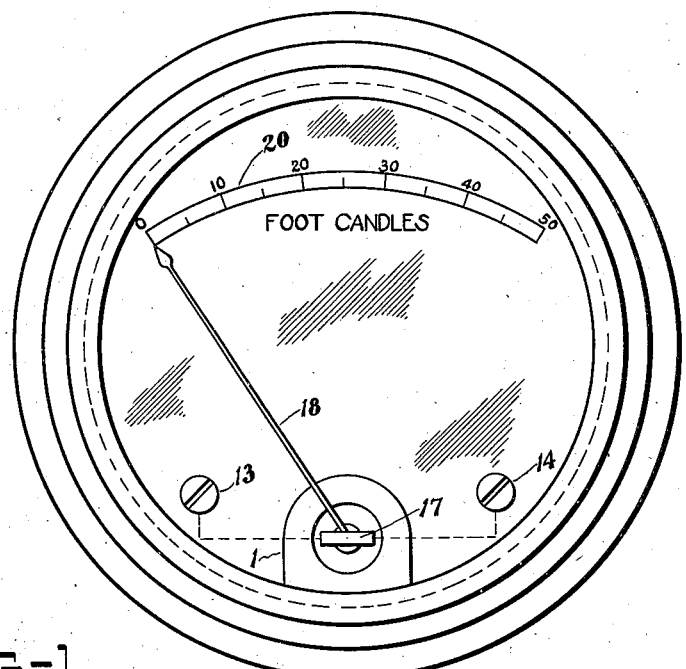
Figure 1 is a plan view of the device.
Figure 2:
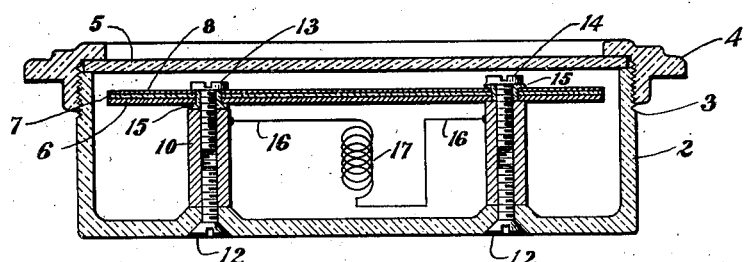
Figure 2 is a sectional view taken on line 2—2, Figure 1.

As shown in Figures 1 and 2 of the drawing the device consists essentially of a milliammeter indicated generally by the numeral 1, having a maximum range of from 1 to 10 milliamperes as the case may be, depending on the intensity of the illumination to be measured and a light responsive current generating device which also forms the dial of the instrument as will be described in detail presently.

The entire device is housed within a relatively small case which comprises a cup-shaped part 2 of unitary construction and preferably formed from a dielectric material as for example some of the aldehyde condensation products. The upper edge of the member 2 is threaded at 3 for detachably receiving an annular rim part 4 by means of which a glass cover plate 5 is secured in place over the face of the instrument. Beneath the removable glass cover there is located a light sensitive plate which forms the dial of the meter and which also generates electrical current directly in accordance with the intensity of the light incident on the face of the plate.

The light sensitive plate in the present case consists of a relatively thin disk of iron 6 covered with a layer of selenium 7 which has been specially heat-treated to produce the amorphous metallic grey light sensitive form of selenium. This film is covered with a very thin film 8 of silver, gold, silicon, or some other metal which can be evaporated and condensed on the selenium surface of the plate in a thin film through which light is readily transmitted. The light transmitting film just referred to forms one conductor of the cell and the iron plate forms the other conductor.

The light sensitive plate is supported in the instrument by means of posts 10 and 11 which may be formed from an electrically conducting material. These posts are conveniently secured in place in the case of the instrument by means of a pair of screws 12—12 and the light sensitive plate is secured to the posts by means of screws 13 and 14. The head of the screw 13 is in electrical contact with the light sensitive face 8 of the plate and serves to electrically connect this portion of the plate to the post 10. Flanged insulating sleeves 15 are used to insulate one side of the plate from the post 10 and to insulate the other side of the plate from the screw 14.

The post 11 is in direct electrical contact with the untreated iron surface of the plate. The posts 10 and 11 are electrically connected by means of conductors 16, 16 to the terminals of the coil 17 located in the field of the magnet (not shown) of the milliammeter 1. An indicating hand 18, actuated in accordance with the current generated in the light sensitive plate, cooperates with a scale 20 to measure and indicate the current generated by the light sensitive cell and flowing through the meter coil 17. This scale may be graduated in foot candles or any other convenient unit by means of which the meter will give a direct reading of the intensity of the total illumination incident on the face of the meter at any desired place.

The scale 20 of the meter may be formed directly on the light sensitive plate or it may be etched upon the glass plate 5 in which latter case it is possible by the use of several glass plates to produce a single instrument in which the unit of measurement can be interchanged by merely changing the glass plate 5 with a plate having different scale etched thereon.

The milliammeter used in connection with this instrument is not described in detail as the meter by itself is not a part of the invention and it is intended to use one of the commercial milliammeters which are available for this purpose.

The form of the device shown herein is of such size and shape that it can be readily transported and used in different places. The form of the milliammeter used in connection with the device is of relatively rugged construction so that extreme care is not required in the use of the instrument. Light sensitive devices other than those shown can be used in connection with this device without sacrificing the feature of the invention that such light sensitive device is carried by and forms a part of the instrument.

It is also feasible to use other forms of light sensitive disks as for example in place of iron, a copper disk can be used having one face oxidized to form the red oxide of copper which is in turn covered with a film such as silver or other metals. This form of disk also exhibits the effect of generating an electrical current when light is allowed to fall on the cuprous oxide coating of the plate. If desired any of the preceding forms of plates may be sealed within an evacuated or gas charged transparent container (not shown).

Figure 3:
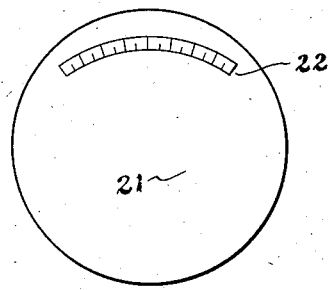
Figure 3 is a plan view of reduced size of a modified form of cover plate.

The cover 5 of the device, by reason of its being removable, permits the use of various light filters in place of the glass cover plate shown and in this way qualitative and quantitative determinations may be made relating to the intensity of radiations of different wave lengths incident at given point or emitted from a given source. As an example of this use of the device, there is shown in Figure 3 a cover plate 21 having a scale 22 graduated in milliamperes. The plate 21 may be formed from light transmitting materials which intercept selectively rays of certain wave lengths as for example ultra violet or infra-red and if desired, units other than milliamperes can be used on the scale. The use of a series of interchangeable cover plates such as shown in Figure 3 obviously greatly extends the utility of the device.

Furthermore it is to be understood that the particular forms of apparatus shown and described, and the particular procedure set forth are presented for purposes of explanation and that various modifications of said apparatus and procedure can be made without departure from this invention as described in the appended claims.

Having thus described my invention what I claim is:

1. A photometric device comprising in combination, a photoelectric cell, an electric current measuring instrument electrically connected thereto, and a case for said cell and instrument, said instrument being provided with removable and replaceable scales in the form of light filters graduated in different units for changing the range of the instrument.

2. A photometric device comprising in combination, a cell in the form of a flat plate formed from a conducting material and having a light-sensitive coating whereby the plate and coating form the elements of a light-sensitive electronic cell, an electrically conducting light transmitting coating over the light-sensitive surface of said cell, an electric current measuring instrument electrically connected to the elements of said cell having a pointer for indicating the value of the current generated by said cell, and a case for said cell and instrument having a slightly greater area than the area of said cell with a transparent cover over said cell and pointer and marked to form the indicating dial of the instrument.

3. In a radiometer, a hollow case comprising a shallow cup-shaped base and a removable light-transmitting cover therefor, a photoelectric cell in the form of a flat plate carried in said case parallel to one of the side walls thereof, means accessible by way of the removable cover of said case for detachably securing said cell in place in said case just below the cover thereof, and an electric current measuring device electrically connected to the elements of said cell, said instrument having an indicating hand movable across the face of said plate.

4. In a radiometer, a hollow case, a photoelectric cell in the form of a flat plate carried in said case parallel to one of the side walls thereof, an electric current measuring device electrically connected to the elements of said cell, said instrument having an indicating hand movable across the face of said plate, and a light transmitting cover forming a wall of said case over said plate and having markings thereon located in cooperative relation with respect to the indicating hand of said instrument and constituting the indicating dial thereof.

5. A photometric device comprising in combination, a photoelectric cell having a face for exposure to the light, an electric meter having a pointer for indicating the value of the current generated by said cell connected thereto, a case for said cell and meter, and a removable and replaceable light filter over said cell having a scale formed thereon and located in cooperative relation with respect to the pointer of said meter.

6. In a radiometer, a hollow case comprising a shallow cup-shaped base and a removable and replaceable light-transmitting cover forming the top wall thereof, a photoelectric cell in the form of a flat plate carried in said case parallel to the top wall thereof, an electric meter in said case connected to the elements of said cell, said meter having a pointer movable across the face of said plate, the cover of said case being marked with graduations cooperating with the pointer of said meter to form the indicating dial of the meter.

ORAN T. McILVAINE.